United States Patent
Noghanian et al.

(10) Patent No.: US 7,404,206 B2
(45) Date of Patent: Jul. 22, 2008

(54) NETWORK SECURITY DEVICES AND METHODS

(75) Inventors: Sima Noghanian, Edmonton (CA); Patrick Mullen, San Francisco, CA (US); Himanshu Dwivedi, San Francisco, CA (US); Geoff Hayward, Edmonton (CA); Bob Beck, Edmonton (CA)

(73) Assignee: YottaYotta, Inc., Edmonton, Alberta (CA)

( * ) Notice: Subject to any disclaimer, the term of this patent is extended or adjusted under 35 U.S.C. 154(b) by 579 days.

(21) Appl. No.: 10/198,728

(22) Filed: Jul. 16, 2002
(Under 37 CFR 1.47)

(65) Prior Publication Data
US 2003/0126467 A1 Jul. 3, 2003

Related U.S. Application Data

(60) Provisional application No. 60/306,533, filed on Jul. 17, 2001.

(51) Int. Cl.
*G06F 21/00* (2006.01)
*G06F 15/16* (2006.01)

(52) U.S. Cl. .................. 726/14; 709/245; 709/246

(58) Field of Classification Search .......... 713/153; 709/230, 231
See application file for complete search history.

(56) References Cited

U.S. PATENT DOCUMENTS

| | | | | |
|---|---|---|---|---|
| 5,793,763 A | * | 8/1998 | Mayes et al. | 370/389 |
| 6,148,414 A | * | 11/2000 | Brown et al. | 714/9 |
| 6,154,839 A | * | 11/2000 | Arrow et al. | 713/154 |
| 6,175,867 B1 | * | 1/2001 | Taghadoss | 709/223 |
| 6,400,730 B1 | * | 6/2002 | Latif et al. | 370/466 |
| 6,886,103 B1 | * | 4/2005 | Brustoloni et al. | 726/15 |
| 6,963,982 B1 | * | 11/2005 | Brustoloni et al. | 726/15 |
| 6,993,012 B2 | * | 1/2006 | Liu et al. | 370/352 |
| 6,993,026 B1 | * | 1/2006 | Baum et al. | 370/392 |
| 6,996,621 B1 | * | 2/2006 | Borella et al. | 709/228 |
| 2002/0120782 A1 | * | 8/2002 | Dillon et al. | 709/246 |
| 2002/0141384 A1 | * | 10/2002 | Liu et al. | 370/352 |
| 2002/0191602 A1 | * | 12/2002 | Woodring et al. | 370/389 |
| 2003/0093563 A1 | * | 5/2003 | Young et al. | 709/245 |
| 2004/0073707 A1 | * | 4/2004 | Dillon | 709/245 |
| 2004/0103275 A1 | * | 5/2004 | Ji et al. | 713/150 |
| 2004/0243710 A1 | * | 12/2004 | Mao | 709/227 |

FOREIGN PATENT DOCUMENTS

WO WO 02/102013 A2 * 12/2002

* cited by examiner

*Primary Examiner*—Christopher A Revak
(74) *Attorney, Agent, or Firm*—Townsend and Towsend and Crew LLP; Gerald T. Gray

(57) ABSTRACT

An OSI layer 2 network device on the edge of a network such as a SAN is configured to replace the original source address of traffic entering the network with a known identifier or address, which is used to signify that entry point as the traffic source to the other nodes of the network. Nodes of the network recognize the new source address as a valid source address. The network device also maintains state (e.g., association of original source address with new source address/identifier) so as to translate addresses to enable reply traffic to be sent back to the original sender.

20 Claims, 5 Drawing Sheets

NETWORK SECURITY DEVICES AND METHODS

CROSS-REFERENCES TO RELATED APPLICATIONS

This application claims the benefit of U.S. Provisional Patent Application Ser. No. 60/306,533, filed Jul. 17, 2001, the contents of which are hereby incorporated by reference in its entirety.

BACKGROUND OF THE INVENTION

Traditionally, network level identifiers (World Wide Names, MAC addresses, etc.) are used in networks to identify and direct traffic. However, because network level identifiers are often spoofable, this becomes a problem when using such identifiers in a manner which affects security (such as who has access to what resources on the network). Spoofing is particularly problematic for storage area networks (SANs), which are traditionally viewed as large zones of trust.

A network device on the edge of a SAN network (or other network) typically identifies sources of traffic based on the entry point into the SAN, unfortunately, that source information is then lost as traffic is routed through the SAN to it's eventual destination. All that is left to identify the source of traffic is the network level identifiers (World Wide Name, etc.). Without the information about the entry point of traffic into a SAN network, node devices can't tell for sure if the traffic they are seeing is really traffic from host A, which came in to the network from where host A is connected, or simply traffic identified as from host A, but which really entered the SAN from another place, or was injected by hostile activity.

Accordingly, it is desirable to provide network security devices and methods that help prevent traffic spoofing and which maintain information that identifies the source of traffic.

BRIEF SUMMARY OF THE INVENTION

The present invention provides security enhanced network devices, and methods, that help prevent traffic spoofing and to maintain information that identifies the source(s) of traffic.

According to the present invention, a layer 2 network device on the edge of a network such as a SAN is configured to replace the original source address of traffic entering the network with a known identifier or address, which is used to signify that entry point as the traffic source to the other nodes of the network. Nodes of the network recognize the new source address as a valid source address. The network device also maintains state (e.g., association of original source address with new source address/identifier) so as to translate addresses to enable reply traffic to be sent back to the original sender.

According to an aspect of the present invention, a method is provided for enhancing security in a network using a network entry device. The method typically includes receiving a first data packet from a host device at a first port of the network entry device, the first data packet having a source address field including a first network layer source address identifying the host device, a destination address field including a destination address identifying a destination device on the network, and a payload field including data. The method also typically includes replacing the first network layer source address with a private address identifying the first port on the network device so as to produce a first modified data packet, and sending the first modified data packet to the destination device over the network, wherein nodes on the network recognize the private address as a valid address.

According to another aspect of the present invention, a network device that provides enhanced security features to a network is provided. The device typically includes a first network entry port for receiving a first data packet from a host device external to the network, said first data packet having a source address field including a first network layer source address identifying the host device, a destination address field including a destination address identifying a destination device on the network, and a payload field including data. The device also typically includes an address replacement module configured to replace the first network layer source address with a private address identifying the first network entry port on the network device so as to produce a first modified data packet, and a network port coupled to the network. The first modified data packet is sent from the network port to the destination device over the network, and nodes on the network recognize the private address as a valid address.

Reference to the remaining portions of the specification, including the drawings and claims, will realize other features and advantages of the present invention. Further features and advantages of the present invention, as well as the structure and operation of various embodiments of the present invention, are described in detail below with respect to the accompanying drawings. In the drawings, like reference numbers indicates identical or functionally similar elements.

DETAILED DESCRIPTION OF THE INVENTION

Figure 1:
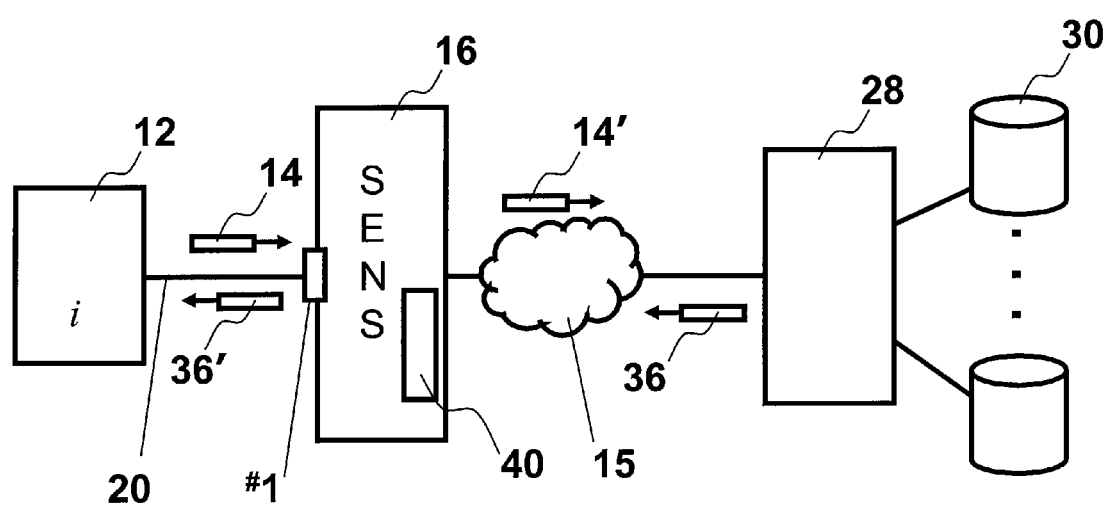
FIG. 1 illustrates a process of address translation in a network using a layer 2 network device according to an embodiment of the present invention.

According to preferred aspects of the present invention, a network layer (e.g., OSI layer 2) device on the edge of a network is configured to perform several novel functions to enhance security in the network, e.g., help prevent traffic spoofing. A network device configured according to the present invention is particularly useful in a storage area network (SAN). Aspects of the present invention will hereinafter be described in the context of a SAN, however, it should be appreciated that the invention is applicable for use in other networks, such as a LAN, WAN, VPN, etc. In one embodiment, for example, a layer 2 network device on the edge of a SAN (a "permiter" device) is configured to replace the original source address of traffic entering the SAN with a known identifier or address, which is used to signify that entry point as the traffic source to the other nodes of the SAN. Nodes of the SAN recognize the new source address as a valid source address. The permiter device also maintains state (e.g., association of original source address with new source address/identifier) so as to translate addresses to enable reply traffic to be sent back to the original sender. Such permiter devices preferably do not pass any traffic through to the network without source address replacement. This operation is similar to the use of Network Address Translation (NAT) by traditional network security devices, but is applied at the network layer (layer 2), whereas NAT is applied at layer 3. Also, the operations of the present invention are also particularly useful in a SAN network, particularly in a Fibre Channel (FC) based network. With such address translation performed at the permiter of the SAN, internal node devices are able to make access decisions based on the new source address, knowing the only way they see traffic from that address is that it came from the corresponding entry point into the network. In effect, this operation provides a way to maintain the information about the entry point of the network past the permiter devices in the network.

In another embodiment, the layer 2 network security device also performs encapsulation of received data. The original data frames are encapsulated at the permiter of the SAN network. Internal node devices decapsulate the frames received from the permiter device as necessary. In this embodiment, no traffic is allowed to pass without encapsulation—this means that the entry point to the network is always known based on the source of the encapsulated traffic. The original frame is decapsulated at the destination and the validity of the request is determined based not only on the claimed origin of the original frame, but also on the permiter device which performed the encapsulation. For example, a data frame claiming to come from host A, but which did not enter at host A's entry point to the network would be recognized as invalid, and discarded.

One example of a layer 2 network device that can be configured according to the present invention is a Netstorager™ controller card provided by YottaYotta Inc. Aspects of such a controller card, and similar devices, are described in U.S. Pat. No. 6,148,414, the contents of which are incorporated by reference herein for all purposes. It should be appreciated, however, that other network devices may implement the functionality of a layer 2 network security device as described herein. Such controllers and devices may be configured as described herein and implemented in an edge switch or other switch device. A device configured according to the present invention may also be implemented as a stand-alone device or as one of a plurality of such controllers, for example, in a chassis (e.g., carrier class configuration), and coupled to a switch device.

Figure 2:
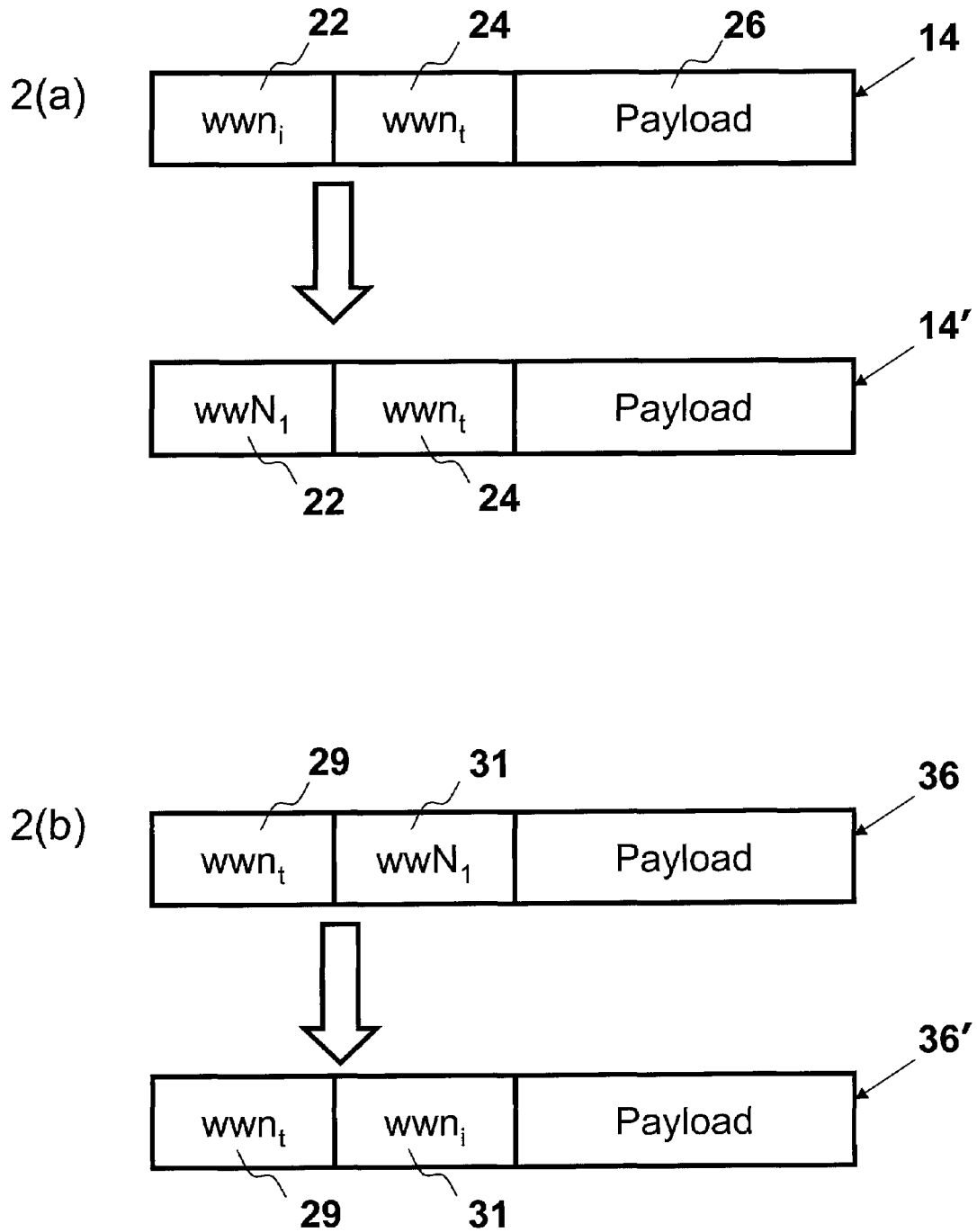
FIG. 2 illustrates data packets and modified data packets as modified according to an embodiment of the present invention.

FIG. 1 illustrates a process of address replacement in a network using a security enhanced network switch (SENS) network device configured according to an embodiment of the present invention. As shown, host machine 12 sends a packet 14 to network device 16 over connection 20. Connection 20 preferably includes a direct physical connection, but may include a wireless link, a series of connections (e.g., nodes and links) and/or a network such as the Internet. Host 12 may be any type of computer or network device that can be communicably coupled to network device 16 over connection 20. For example, any desktop or laptop computer system executing code using a CPU and including a communication module such as a modem, network interface card, wireless interface module and the like, may communicably couple to network device 16. As illustrated in FIG. 2a, packet 14 includes a source address field 22, a destination address field 24, and a payload field 26, which may include subfields (e.g., CRC field) and additional address fields. Source address field 22 includes the address of host machine 12, and destination address field 24 includes the address of a destination device. For example, as shown, the source address, $wwn_i$, identifies host 12 (i:initiator), and the destination address, $wwn_t$, identifies the target device (t:target). In one embodiment, the destination address preferably identifies a port in a switch or on a storage controller device associated with a particular storage device 30 or a storage array (e.g., one or more storage units). Upon receipt of one or more such packets, the recipient device (e.g., switch or storage controller) initiates the storage or retrieval process as dictated by the data in the packet payload(s). As shown in FIG. 1, in one embodiment, a recipient storage controller resides in a switch device 28, which is communicably coupled to network 15.

According to one aspect of the present invention, network device 16 includes an address replacement module 40 configured to replace the source address, e.g., $wwn_1$, with a private address, e.g., $wwN_1$, so as to produce a modified packet 14' (see also FIG. 2a). The replacement address is termed "private" in that node devices in network 15 recognize the address as valid, but devices outside network 15 may not. Preferably, network device 16 only accepts and processes IO request packets from a host node with an approved World Wide Name. Also, in certain aspects, the network device 16 preferably performs authentication based on the WWN and key exchange so as to help prevent spoofing and to allow the SENS device 16 to be shared by multiple hosts/customers. In one embodiment, the private address identifies the port from which the packet was received from host 12, e.g., port #1, on network device 16 as shown in FIG. 1. Thus, in one embodiment as shown, the private address for port #1 is $wwN_1$. The address replacement module 40 stores the source address to a memory in association with the private address, preferably in a table 42 (see FIG. 3) for later use. The operation of the address replacement module 40 will be described in more detail later with reference to FIGS. 3 and 5. From network device 16, modified packet 14' passes to the destination device via network 15, which may include many nodes and links. Preferably network 15 includes a FC-based storage area network (SAN) but other SANs, such as a SCSI-based SAN, or other networks may be implemented.

Figure 3:
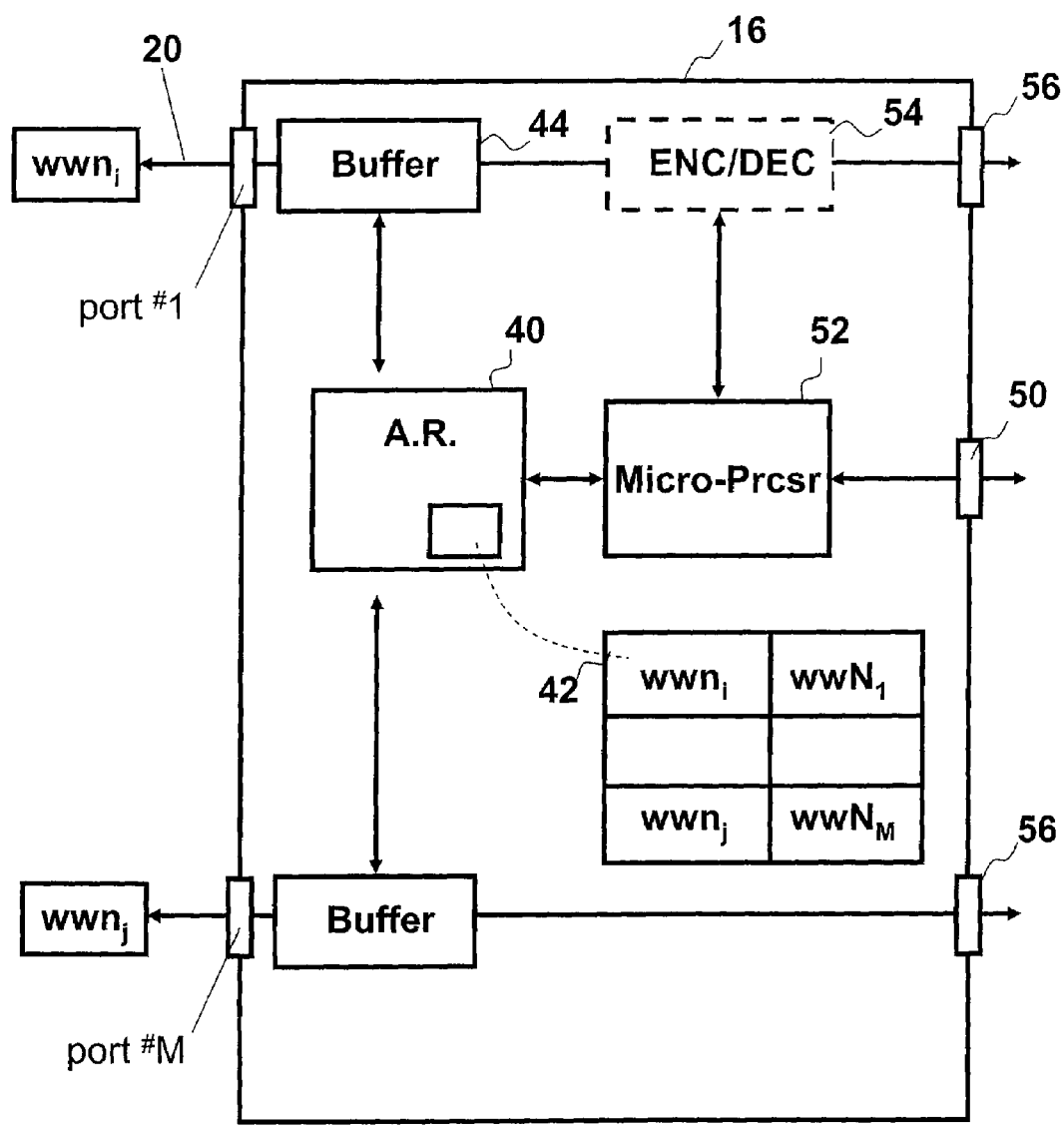
FIG. 3 is a block diagram of a network device according to an embodiment of the present invention.
Figure 4:
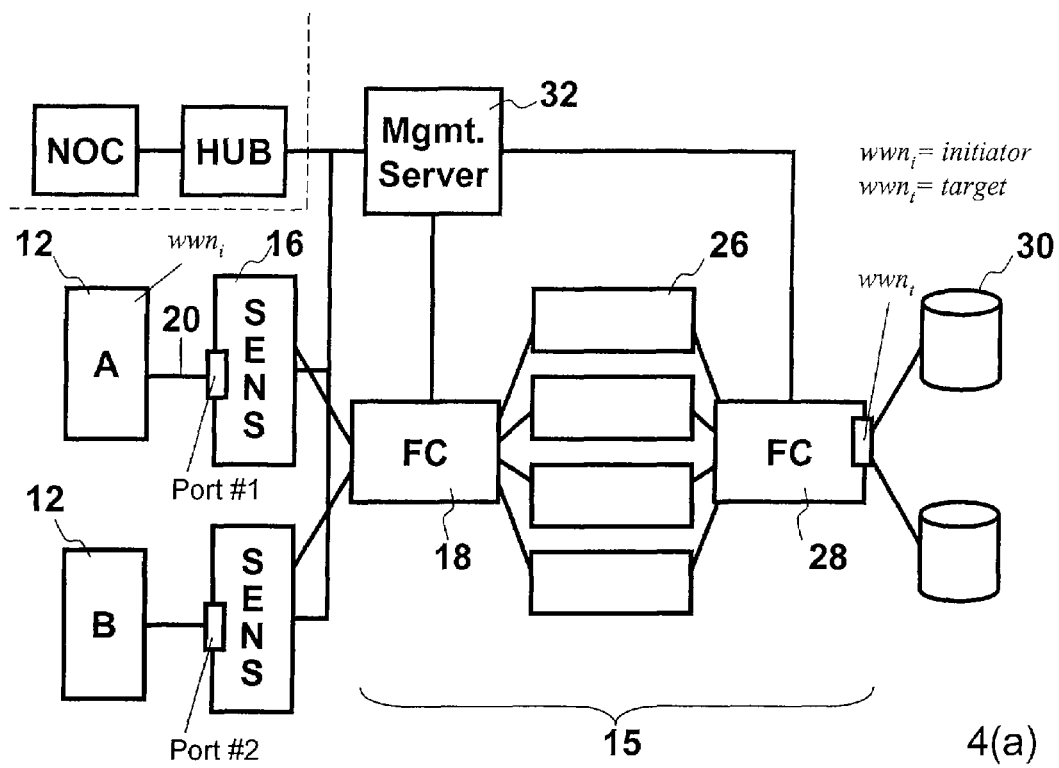
FIG. 4 illustrates possible network configurations for the network of FIG. 1.
Figure 4:
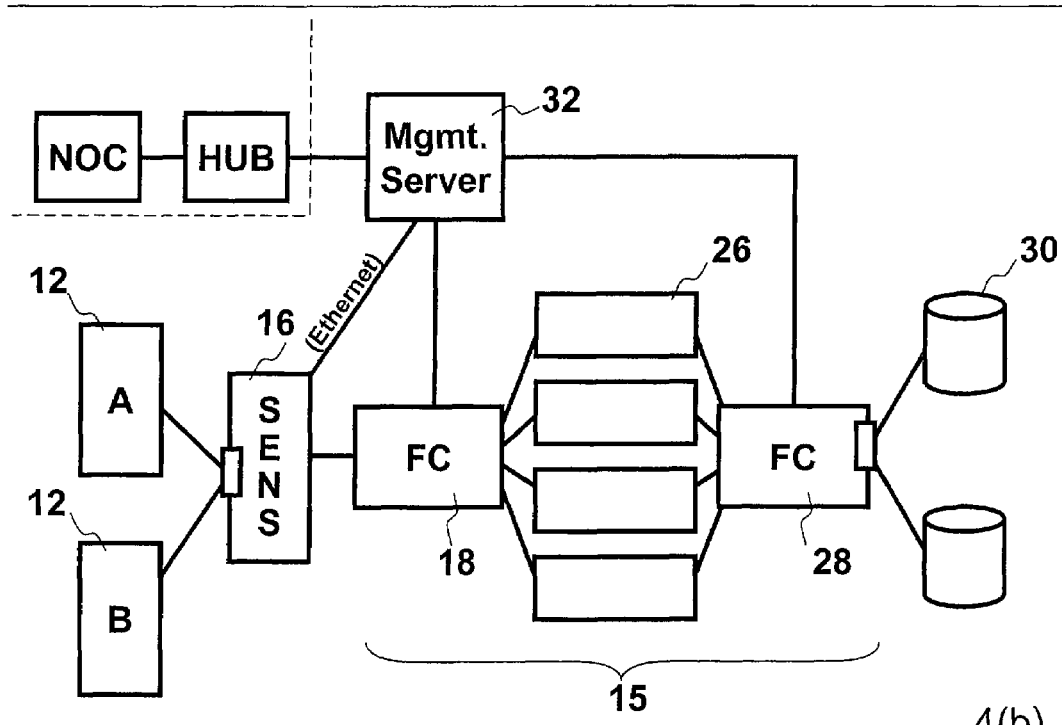

FIGS. 4a and 4b illustrate possible network configurations for network 15 of FIG. 1. As shown in FIGS. 4a and 4b, for example, modified packet 14' passes from SENS device 16 to switch device 18, and through one of a plurality of optional network storage controllers 26 to a switch device 28 connected to target storage devices 30. Upon receipt of packet 14', switch device 28 stores the source address to memory (now the private address as provided by the address replacement module of network device 16, e.g., $wwN_1$) for later use. Preferably, as shown in FIG. 4, network 15 connecting network device 16 and the destination storage devices includes an FC network, but it may include other network components and media. For example, as shown in FIG. 4b, a network management server 32 is preferably connected to an Ethernet port 50 (FIG. 3) on network device 16 over an Ethernet network such that management traffic is preferably completely separated from the data traffic on network 15, although management traffic and data traffic may be supported on the same network, for example by using switches or other node devices with authentication functionality. In this manner management commands/traffic (Ethernet) are separated from standard storage data traffic (FC). As shown in FIG. 4b, multiple hosts may share SENS device 16, or a port on SENS device 16. In such case, additional security features are preferably implemented, for example, LUN masking and data encryption techniques may be used as are well known.

Referring back to FIG. 1, in the reverse direction, a reply packet 36 (FIG. 2b) from a storage device 30 (or other device) destined for host 12 passes through the network 15 to network device 16. As shown in FIG. 2b, packet 36 includes a source address field 29 and destination address field 31. Source address field 29 includes the address of the initiator, in this case the storage unit(s) (or other device), e.g., a port on a storage controller. Destination address field 31 includes the destination address. The storage controller in switch 28 provides the (previously stored) private address that identifies port #1 of network device 16 as the destination address. Upon receipt of packet 36 by network device 16, address replacement module 40 reads the destination address in packet 36. In this case, the destination address is the private address, e.g., the address for port #1 on network device 16. Network device 16 performs a lookup in table 42 for the destination address and replaces the private address identifying port #1, namely $wwN_1$, with the address of host 12, namely $wwn_1$, to produce modified packet 36'. Modified packet 36' is then forwarded across network connection 20 to host machine 12.

With reference to FIG. 3, according to one embodiment, network device 16 operates generally as follows. When a packet, e.g., packet 14, is received at port #1, the packet is loaded into port buffer 44, and address replacement module 40 reads the source address 22 in packet 14. The address of host machine 12 in source address field 22 is replaced with a private address to produce a modified packet, e.g., packet 14', and these two addresses are stored in a table 42 for later use. For example, as shown in FIG. 3, the original source address of host 12 ($wwn_1$) is stored in association with the new private address ($wwN_1$) in table 42. The modified packet 14' is then sent to the destination/target over network 15 via a network port 56 on device 16. The modified packet 14' passes through network 15 as a valid packet based on the new private address, $wwN_1$, which is recognized as a valid address by nodes of network 15. When return packet 36 is received by network device 16 viw a port 56 and loaded into a buffer 44, address replacement module 40 reads the private address in source address field 31 and performs a lookup for the appropriate outside destination address in table 42. Thus, the private destination address, $wwN_1$, is replaced with the address of host machine 12, namely $wwn_i$. This enables modified packet 36' to be forwarded to host machine 12. The operation of address replacement module 40 is described in more detail below with reference to FIG. 5. As shown in FIG. 3, network device 16 may include multiple, M, ports, each with a corresponding buffer space, which may be implemented as the same or separate physical memory units. Additionally, network device 16 includes one or more network ports 56, which are preferably implemented as FC ports, but may be other port typs such as PCI, SCSI, etc. Microprocessor module 52 provides overall control and management of the processes and components of network device 16. Encryption/decryption engine 54 is provided in some embodiments to encrypt and decrypt data sent over network 15.

Figure 5:
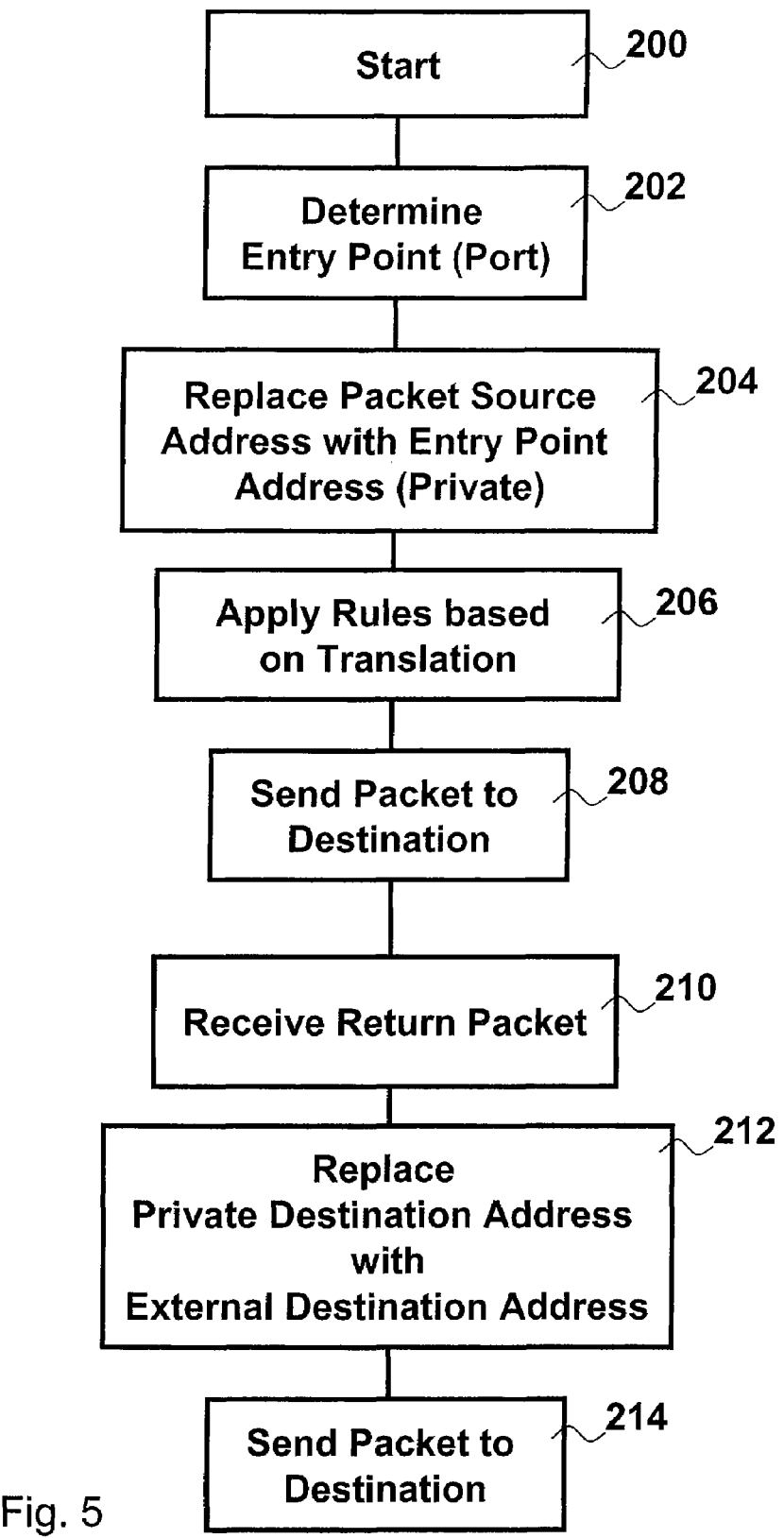
FIG. 5 is a flow chart illustrating some of the operations performed by a network device in processing a packet sent from a host machine to a destination device according to an embodiment of the present invention.

FIG. 5 is a flow chart illustrating some of the operations performed by the SENS system in processing a packet sent from a host machine to a destination device on network 15 through network device 16 according to an embodiment of the present invention. The system starts in state 200 when a packet is received into a port buffer, e.g., buffer 44, and proceeds to state 202. In state 202, the system determines from which port the packet was received if network device 16 includes more than one network entry port (e.g., port #1 to port #M). In state 204, the system replaces the source address in the received packet with an address that uniquely identifies the entry point to the network 15 guarded by network device 16. For example, for port #1 of FIG. 3, the system replaces the address of host 12, $wwn_1$, in source address field 22 with the private address $wwN_1$. An entry is created in table 42 for the first packet received from that source device at that particular port. The entry created includes the external address of host 12 from source address field 22 and the private replacement address. For packets subsequently received at that port, a lookup in table 42 is performed. Similar processing occurs when packets are received at other network entry ports—a table/data structure with multiple entries is built.

In one embodiment, the entry point address (private address) for each port is pre-configured and stored in network device 16. Also, the network 15 and all nodes therein are preferably pre-informed of each valid private address. For example, network device 16, or a management server 32, broadcasts the private addresses to all nodes in network 15 in one embodiment. Each private address preferably uniquely identifies a specific port on network device 16. Such address replacement is preferably performed by software. That is, address replacement module 40 is preferably a software module executed by microprocessor unit 52 or other specialized processor module. However, address replacement may be performed entirely by hardware or a combination of hardware and software. Address replacement module 40 may be implemented as an ASIC, or an FPGA, or other device module.

In state 206, rules are applied based, e.g., on the private address. For example, in one embodiment, in state 206 the private address is used an authentication algorithm or a lookup verification process and the packet is processed accordingly. In state 208, the modified packet 14' is sent to its destination over network 15. Each node in network 15 that receives the packet 14' will recognize the source address (private address identifying valid entry point) in modified packet 14' as being a valid source address and will handle the packet appropriately.

The above process repeats in essentially the same manner for all subsequent packets from host 12, except that for subsequent packets, the private address is preferably looked up in the translation table and inserted into field 22.

For return data packets destined for external hosts, the reverse process is performed. In state 210, a return packet 36 is received by network device 16 over network 15. The return packet may include requested data, e.g., from a read operation, or it may include a confirmation of completion of a requested operation, e.g., from a write operation. The system receives return packet 36 directed to a private address on network device 16. The system next proceeds to state 212. In state 212, the system uses the private address from destination address field 31 to look up the external address 22 of the host, e.g., host 12, in table 42 and replaces the private address, e.g., $wwN_1$, in destination address field 31 with the address of the host, e.g., $wwn_1$. In state 214, the system forwards return packet 36' across network connection 20 to host 12.

In one embodiment, encapsulation and decapsulation of packets is performed. Encapsulation/decapsulation module 54 is provided on SENS device 16 in embodiments where encapsulation and decapsulation is desired. Preferably encapsulation of the packets is performed after address translation/replacement has been performed, although a private address may be appended to an encapsulated packet. Internal node devices decapsulate the frames received from the permiter device as necessary. In this embodiment, no traffic is allowed to pass without encapsulation—this means that the entry point to tile network is always known based on the source of the encapsulated traffic. The original frame is decapsulated at the destination node and the validity of the request is determined based not only on the claimed origin of the original frame, but also on the identity of the permiter device which performed the encapsulation.

In one embodiment, the system optionally encrypts, compresses, and adds authentication information to reply packet

36. (Note that encryption and decryption of packet 14 and reply packet 36 are not part of the address replacement feature of the present invention. One embodiment of the present invention provides no such encryption or decryption.)

While the invention has been described by way of example and in terms of the specific embodiments, it is to be understood that the invention is not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A method of providing enhanced security to a network using a network entry device, comprising:
   receiving a first data packet from a host device at a first port of the network entry device, said first data packet having a source address field including a first layer 2 source address identifying the host device, a destination address field including a destination address identifying a destination device on the network, and a payload field including data;
   replacing the first layer 2 source address with a private address identifying the first port on the network device so as to produce a first modified data packet; and
   sending the first modified data packet to the destination device over the network, wherein nodes on the network recognize the private address as a valid address.

2. The method of claim 1, wherein the network is a Fibre Channel network.

3. The method of claim 1, wherein the network is a storage area network.

4. The method of claim 1, wherein the network entry device is a controller card.

5. The method of claim 4, wherein the controller card is implemented in an edge switch.

6. The method of claim 1, wherein the host has a dedicated connection to the first port of the network entry device.

7. The method of claim 1, further including:
   creating an entry in an address table in the network entry device, said entry including the private address and the first layer 2 source address.

8. The method of claim 7, further including, for subsequent packets received from the first host at the first port:
   performing a lookup in the address table using the first layer 2 source address identifying the first host to obtain the corresponding private address; and
   replacing the first layer 2 source address with said corresponding private address.

9. The method of claim 1, further comprising:
   receiving a reply data packet from the destination device, the reply data packet having said private address in a destination address field;
   replacing the private address in the destination address field of the reply packet with said first layer 2 source address identifying the host so as to produce a modified reply packet; and
   sending the modified reply packet to the host device.

10. A network device that provides enhanced security to a network, the device comprising:
    a first network entry port for receiving data packets from a host device external to the network, wherein a first data packet is received from the host, said first data packet having a source address field including a first layer 2 source address identifying the host device, a destination address field including a destination address identifying a destination device on the network, and a payload field including data;
    an address replacement module configured to replace layer 2 source addresses with private addresses, wherein the first layer 2 source address of the first data packet is replaced with a first private address identifying the first network entry port on the network device so as to produce a first modified data packet; and
    a network port coupled to the network,
    wherein the first modified data packet is sent from the network port to the destination device over the network, and wherein nodes on the network recognize the first private address as a valid address.

11. The device of claim 10, wherein the network is a Fibre Channel network.

12. The device of claim 10, wherein the network is a storage area network.

13. The device of claim 10, wherein the device is implemented in a controller card on the edge of the network.

14. The device of claim 10, further including a memory for storing an address table, wherein the address replacement module creates an entry in the address table, said entry including the first private address and the first layer 2 source address.

15. The device of claim 14, wherein for subsequent packets received from the first host at the first network entry port, the address replacement module performs a lookup in the address table using the first layer 2 source address identifying the first host to obtain the corresponding private address, and replaces the first layer 2 source address with said corresponding private address.

16. The device of claim 10, wherein the device receives a reply data packet from the destination device via the network port, the reply data packet having said private address in a destination address field, wherein the address replacement module is configured to replace the private address in the destination address field of the reply packet with said first layer 2 source address identifying the host so as to produce a modified reply packet, and wherein the modified reply packet is sent to the host device via the first network entry port.

17. The device of claim 10, further including an encapsulation/decapsulation module, coupled to the address replacement module, configured to encapsulate modified data packets and decapsulate encapsulated modified reply packets.

18. A network device that provides enhanced security to a network, the device comprising:
    one or more network entry ports for receiving data packets from one or more host devices external to the network, wherein a first data packet is received from a first host, said first data packet having a source address field including a first layer 2 source address identifying the first host device, a destination address field including a destination address identifying a destination device on the network, and a payload field including data;
    an address replacement module configured to generate private addresses identifying network entry ports on the network device and to replace layer 2 source addresses with the private addresses, wherein the first layer 2 source address of the first data packet is replaced with a first private address identifying the first network entry port on the network device so as to produce a first modified data packet; and
    a network port coupled to the network,
    wherein the first modified data packet is sent from the network port to the destination device over the network, and wherein nodes on the network recognize the first private address as a valid address.

19. The device of claim 18, further including a memory for storing an address table, wherein the address replacement module creates an entry in the address table, said entry including the first private address and the first layer 2 source address.

20. The device of claim 19, wherein for subsequent packets received from the first host at the first network entry port, the address replacement module performs a lookup in the address table using the first layer 2 source address identifying the first host to obtain the corresponding private address, and replaces the first layer 2 source address with said corresponding private address.

* * * * *